United States Patent
Chien et al.

(10) Patent No.: US 8,004,761 B2
(45) Date of Patent: Aug. 23, 2011

(54) STEREO PROJECTION OPTICAL SYSTEM

(75) Inventors: I-Pen Chien, Taipei Hsien (TW); Yuan-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 815 days.

(21) Appl. No.: 11/955,301

(22) Filed: Dec. 12, 2007

(65) Prior Publication Data

US 2009/0096991 A1   Apr. 16, 2009

(30) Foreign Application Priority Data

Oct. 11, 2007   (CN) .......................... 2007 1 0202020

(51) Int. Cl.
*G02B 5/30* (2006.01)
*G02B 27/28* (2006.01)
*G02B 21/00* (2006.01)

(52) U.S. Cl. ......... 359/485.05; 359/485.06; 359/489.07; 359/636; 353/8; 353/20; 353/33; 353/34; 353/81; 353/82

(58) Field of Classification Search ............ 359/485.01, 359/485.03, 485.05, 485.06, 485.07, 636; 359/489.07; 353/7, 8, 82, 84, 20, 33, 34, 353/81

See application file for complete search history.

(56) References Cited

U.S. PATENT DOCUMENTS

| | | | |
|---|---|---|---|
| 3,682,532 A * | 8/1972 | Myles | 359/489.07 |
| 5,121,983 A | 6/1992 | Lee | |
| 5,155,623 A * | 10/1992 | Miller et al. | 359/489.09 |
| 5,243,465 A * | 9/1993 | Fein | 359/636 |
| 5,383,053 A * | 1/1995 | Hegg et al. | 359/485.05 |
| 5,790,306 A * | 8/1998 | Kleinberg et al. | 359/368 |
| 5,863,125 A * | 1/1999 | Doany | 353/84 |
| 6,309,071 B1 * | 10/2001 | Huang et al. | 353/31 |
| 6,375,330 B1 * | 4/2002 | Mihalakis | 353/31 |
| 6,899,429 B2 * | 5/2005 | Hamada et al. | 353/20 |
| 7,429,111 B2 * | 9/2008 | Ockenfuss | 353/20 |
| 7,874,677 B2 * | 1/2011 | Chien et al. | 353/7 |
| 7,878,656 B2 * | 2/2011 | Hsu et al. | 353/20 |
| 2005/0017938 A1 | 1/2005 | O'Donnell et al. | |
| 2005/0259225 A1 * | 11/2005 | Greenberg et al. | 353/31 |

FOREIGN PATENT DOCUMENTS

JP   2007017536 A   1/2007

* cited by examiner

*Primary Examiner* — Ricky Shafer
(74) *Attorney, Agent, or Firm* — Altis Law Group, Inc.

(57) ABSTRACT

A stereo projection optical system includes a polarization converter, a 2-way wheel, a retarder, and an image engine. The polarization converter is configured for converting an incident light into a polarized light which have single polarization. The 2-way wheel includes a reflective region and a transmissive region. The reflective region is configured for reflecting the polarized light and the transmissive region is configured for transmitting the polarized light. The retarder is positioned to receive an emergent light from one of the reflective region and the transmissive region. The image engine is positioned to receive light output of the 2-way wheel and the retarder and configured for emitting the light output comprising spatial information. The stereo projection optical systems provide viewers three-dimensional images formed by two alternative polarized light beams whose polarizations are perpendicular to each other utilizing the 2-way wheel.

7 Claims, 4 Drawing Sheets

STEREO PROJECTION OPTICAL SYSTEM

CROSS REFERENCE TO RELATED APPLICATION

This application is related to a U.S. patent application Ser. No. 11/955,294, now U.S. Pat. No. 7,874,677, entitled "STEREO PROJECTION OPTICAL SYSTEM", which was filed on Dec. 12, 2007 and is assigned to the same assignee as the present application. The disclosure of the above-identified application is incorporated herein by reference.

RELATED FIELD

The present invention relates generally to projection optical systems, and more specifically to a stereo projection optical system.

BACKGROUND

Various types of stereoscopic projection optical systems are well known in the art. Such stereoscopic projection optical systems typically include two projectors arranged in parallel so that images from a liquid crystal display (LCD) panel or a slide film are projected on a screen by each light source. As shown in FIG. 4, a conventional stereoscopic projection optical system includes spherical reflective mirrors 1 and 1', lamps 2 and 2', condenser members 3 and 3', LCD panels 4 and 4', and projection lenses 5 and 5'.

In the conventional stereoscopic projection optical system, the stereoscopic picture is obtained by making the polarizing directions of projected beams perpendicular to each other. This is achieved by using two projectors. The picture from the right projector is only visible to the right eye of a viewer, and the picture from the left projector is only visible to the left eye of a viewer.

In the conventional stereoscopic projection optical system, the lamps 2, 2' are independently operated. When the beams from each of the lamps 2, 2' pass through the LCD panels 4, 4' respectively, the beams are respectively polarized in the direction of a polarizing axis of a polarizing plate attached to the light source side of the corresponding LCD panels 4, 4'. As a result, half of the beams condensed by each of the condenser members 3 and 3 is absorbed by the polarizing plate before passing through the corresponding LCD panels 4, 4'. The lost light is absorbed as heat by the polarizing plate. This necessitates a separate cooling device to increase the heat-dissipating efficiency at the polarizing plates of the LCD panels 4, 4'.

It is desired to provide a stereo projection optical system which can overcome the above-described deficiencies.

SUMMARY

In accordance with an exemplary embodiment, a stereo projection optical system includes a polarization converter, a 2-way wheel, a retarder, and an image engine. The polarization converter is configured for converting an incident light into a polarized light, which has a single polarization. The 2-way wheel is positioned to receive the polarized light from the polarization converter and includes a reflective region and a transmissive region. The reflective region is configured for reflecting the polarized light and the transmissive region is configured for transmitting the polarized light. At any given time, the polarized light incidents on one of the reflective region and the transmissive region. The retarder is positioned to receive an emergent light from one of the reflective region and the transmissive region. The image engine is positioned to receive light output of the 2-way wheel and the retarder, and configured for emitting the light output comprising spatial information.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a stereo projection optical system according to each of various embodiments of the present invention will now be made with reference to the drawings attached hereto.

Figure 1:
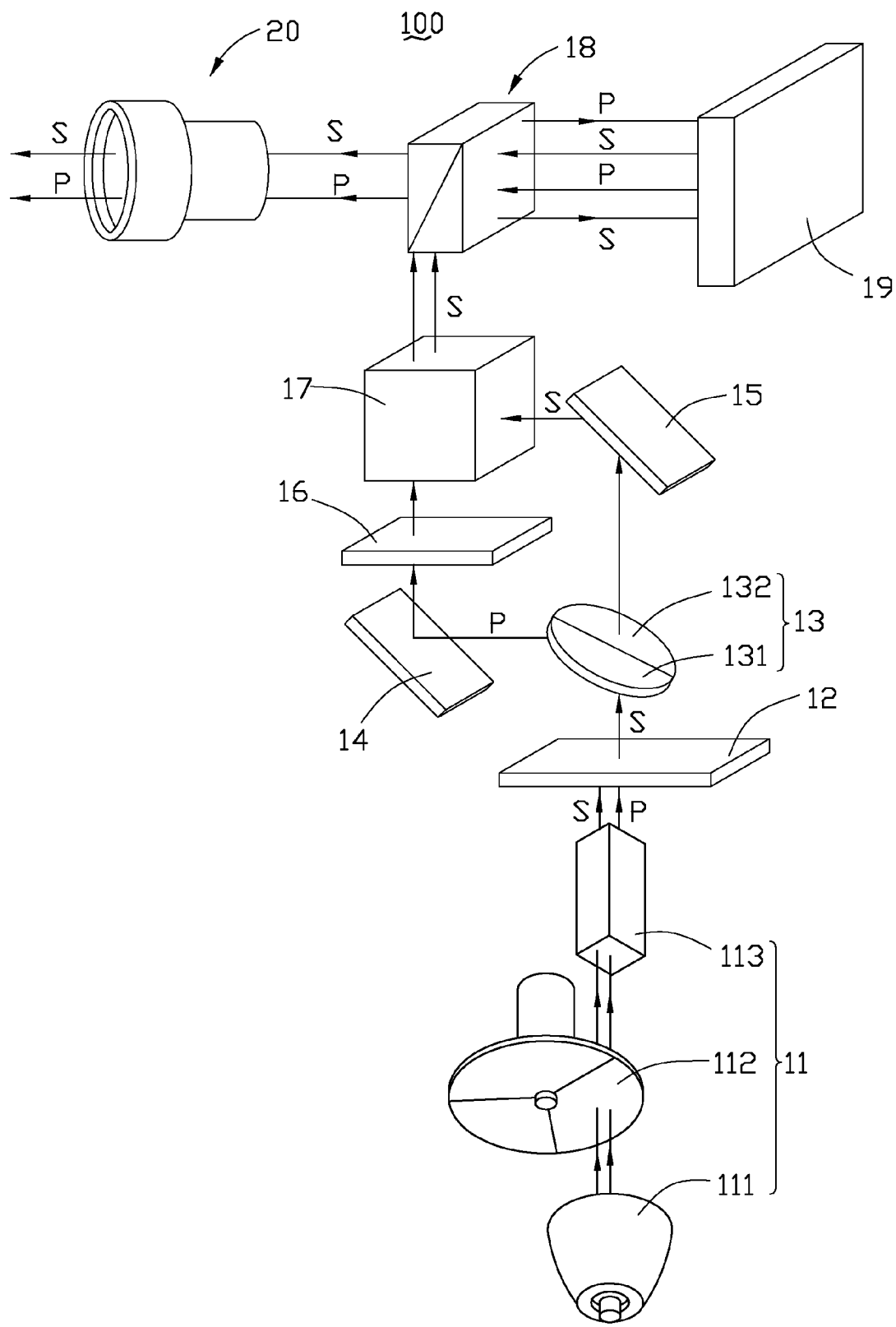
FIG. 1 illustrates a configuration of a stereo projection optical system in accordance with a first embodiment.

Referring to FIG. 1, a stereo projection optical system 100 according to a first embodiment of the present invention is shown. The stereo projection optical system 100 includes a light source assembly 11, a polarization converter 12, a 2-way wheel 13, first, second reflective apparatuses 14, 15, a retarder 16, a polarizing beam splitter (PBS) 17, a total internal reflection prism (TIR) 18, a digital micro-mirror device (DMD) 19, and a projecting lens 20.

It should be noted that the PBS 17, the TIR 18, and the DMD 19 cooperatively function as an image engine configured for emitting a light output having spatial information in the first embodiment.

The light source assembly 11 includes a light source 111, a color wheel 112 positioned to receive light of the light source 111 and a integrator 113 positioned to receive light emerging from the color wheel 112. The light source 111 can be a halogen lamp, a metal halogen lamp, a light emitting diode (LED), and the like. In the present embodiment, the light source 111 is a halogen lamp that emits a white light. The color wheel 112 is configured for splitting the light output from the light source 111 into time-sequenced red, green, and blue light beams. The color wheel 112 includes red, green, and blue color filters, and the center of the color wheel 112 is connected to a motor (not shown) such that the color wheel 112 can be rotated. The integrator 113 is configured for changing the light beam emitted from the color wheel 112 such that light beams exiting the integrator 113 have uniform spatial distribution.

The polarization converter 12 is positioned to receive light output from the light source assembly 11, and is configured for converting the non-polarized white light output from the light source assembly 11 into a polarized light having single polarization. The polarized light can be S-polarized light or P-polarized light. In the first embodiment, the polarized light is S-polarized light.

The 2-way wheel 13 is positioned to receive the S-polarized light from the polarization converter 12 and configured for alternately transmitting and reflecting the S-polarized light to one of the first, second reflective apparatuses 14, 15. The 2-way wheel 13 includes a reflective region 131 and a transmissive region 132. A center portion of the 2-way wheel 13 is connected to a motor (not shown) such that the 2-way wheel 13 can be rotated to allow the reflective region 131 and the transmissive region 132 to alternately receive the S-polarized light. The reflective region 131 is configured for reflecting the S-polarized light to the first reflective apparatus 14. The transmissive region 132 is configured for transmitting the S-polarized light to the second reflective apparatus 15. The reflective region 131 and the transmissive region 132 of the 2-way wheel 13 alternately receive all of the light output of the polarization converter 12. At any given time, the S-polarized light enters one of the reflective region 131 and the transmissive region 132 of the 2-way wheel 13. In this manner, left-eye and right-eye images are formed and then projected onto a screen (not shown) in an alternating manner. When the frequency of alternation is sufficiently fast, the left-eye and right-eye images may appear to a viewer as a single stereographic image.

The first, second reflective apparatuses 14, 15 can be mirrors. The first reflective apparatus 14 is disposed to reflect the S-polarized light reflected by the 2-way wheel 13 to the retarder 16. The second reflective apparatus 15 is disposed to reflect the S-polarized light transmitted by the 2-way wheel 13 to the PBS 17.

The retarder 16 can be a half wave retarder or two overlapped quarter-wave retarders and can be disposed between the first reflective apparatus 14 and the PBS 17 or optionally between the second reflective apparatus 15 and the PBS 17. In the first embodiment, the retarder 16 is a half wave retarder and disposed between the first reflective apparatus 14 and the PBS 17 and configured for converting the entering S-polarized light into the P-polarized light when it exits, as shown in FIG. 1.

The PBS 17 is positioned to receive the light output from the retarder 16 and the second reflective apparatus 15 and configured for reflecting the S-polarized light from the second reflective apparatus 15 into the TIR 18 and transmitting the P-polarized light from the retarder 16 into the TIR 18. The first PBS 17 can be a wire grid polarization (WGP) or a polarizing beam splitter prism. In the present embodiment, the first PBS 17 is a polarizing beam splitter prism.

The TIR 18 is positioned to receive the light output from the PBS 17, and is configured for reflecting light output from the PBS 17 into the DMD 19 and transmitting light output from the DMD 19 to the projecting lens 20.

The DMD 19 is configured for superimposing spatial information on the S-polarized light and P-polarized light alternately enter the DMD 19. The DMD 19 alternately output S-polarized light and P-polarized light having spatial information via the TIR 18 to the projecting lens 20.

The projecting lens 20 is configured for receiving the light output of the TIR 18 and magnifying and projecting an image formed by the light output on a screen.

Figure 2:
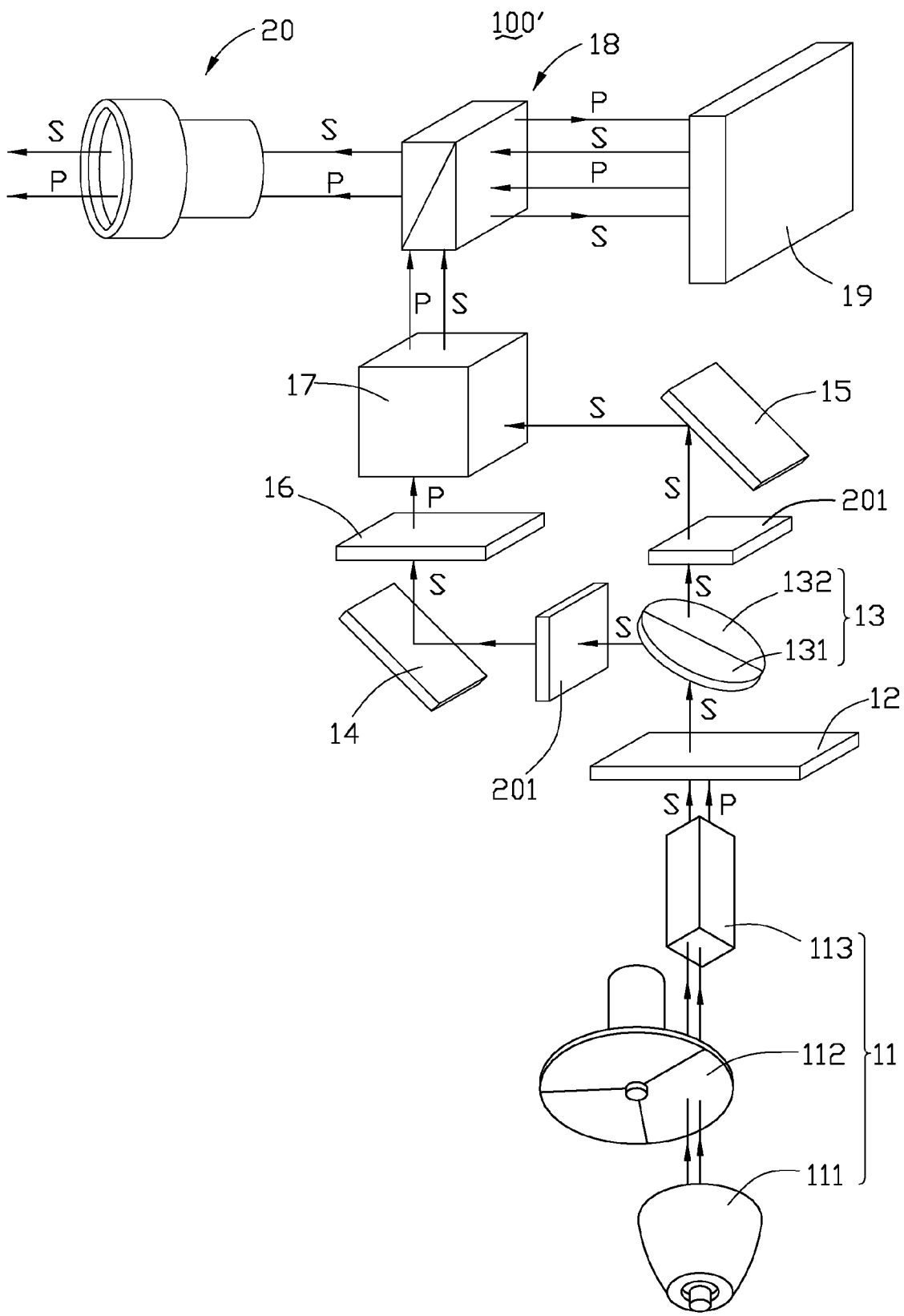
FIG. 2 is similar to FIG. 1, but further illustrates a plurality of analyzers disposed in the stereo projection optical system.

Referring to FIG. 2, in order to promote contrast of images projected by the stereo projection optical system 100', two analyzers 201 may be respectively disposed between the first, second reflective apparatuses 14, 15 and the 2-way wheel 13, and are configured for transmitting light of a predetermined polarization direction and blocking light of other polarization direction. In the present embodiment, the analyzers 201 transmit S-polarized light and remove P-polarized light.

Figure 3:
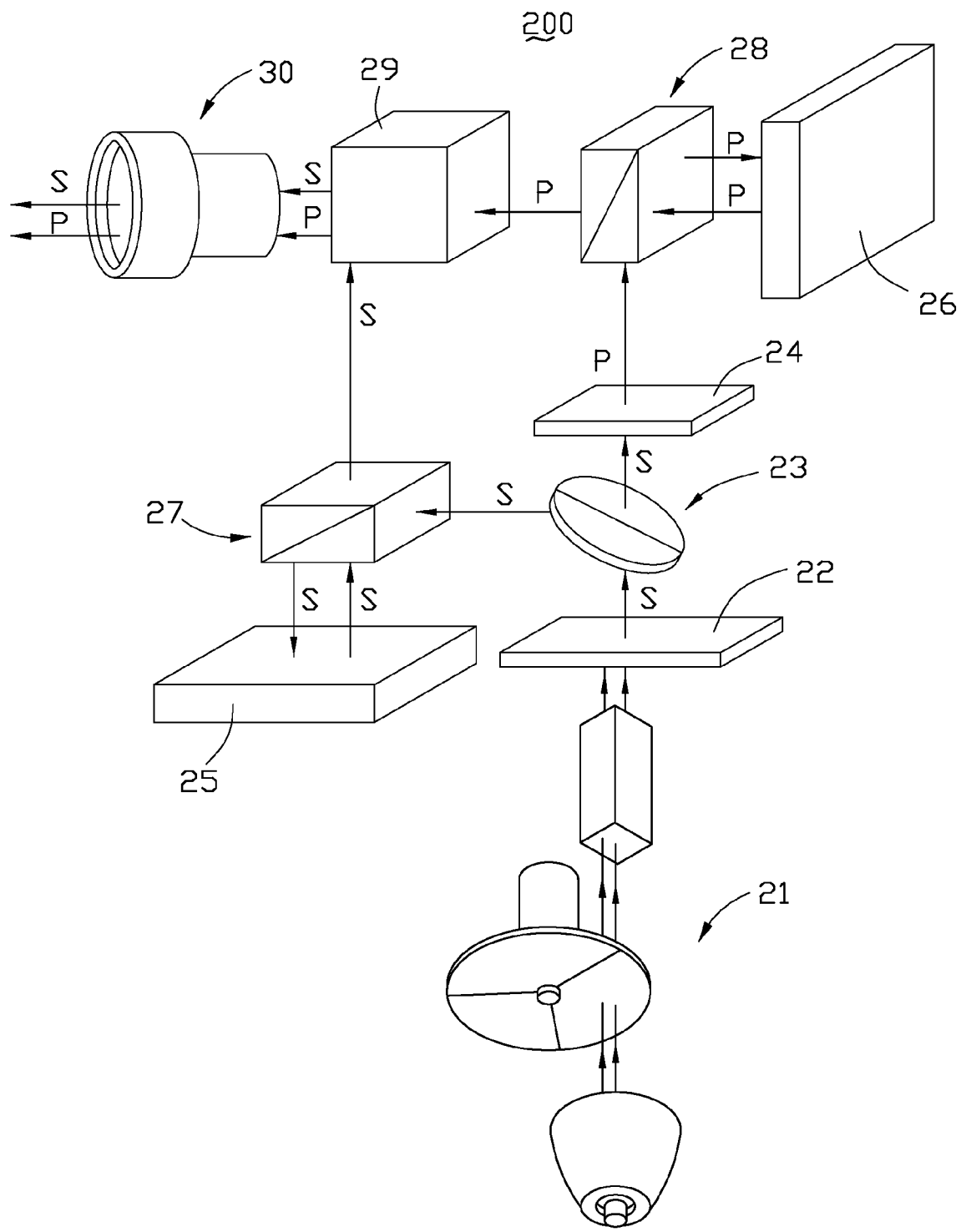
FIG. 3 illustrates a configuration of a stereo projection optical system in accordance with a second embodiment.
Figure 4:
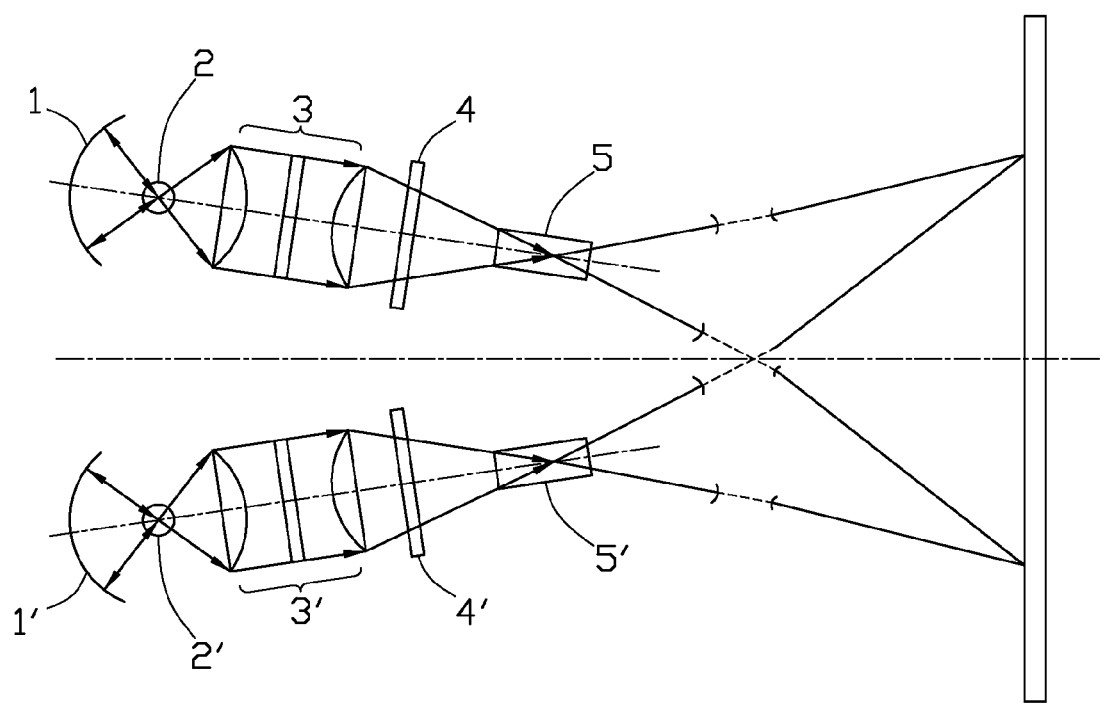
FIG. 4 illustrate a configuration of a conventional stereoscopic projection optical system.

Referring to FIG. 3, a stereo projection optical system 200 according to a second embodiment of the present invention. The stereo projection optical system 200 includes a light source assembly 21, a polarization converter 22, a 2-way wheel 23, a retarder 24, first, second DMDs 25, 26, first, second TIRs 27, 28, a light combiner 29, and a projecting lens 30.

Difference between the first embodiment and the second embodiment is that the first, second DMDs 25, 26, The first, second TIR 27, 28 and the light combiner 29 cooperatively function as an image engine configured for emitting a light output having spatial information in the second embodiment. Configuration, working principle, and the light path of the light source assembly 21, the polarization converter 22, the 2-way wheel 23, and the retarder 24 of the second embodiment is substantially same as those of the first embodiment.

The first, second TIRs 27, 28 are positioned to respectively receive the light output from the 2-way wheel and the retarder 24, and configured for reflecting the light into the first, second DMDs 25, 26 and transmitting the light output having spatial information to the light combiner 29.

The first, second DMDs 25, 26 are respectively positioned to receive the light reflected by the first, second TIRs 27, 28, and configured for superimposing spatial information on the light output and emitting the light output having spatial information.

The light combiner 29 can be an X-prism or a polarizing beam splitter. In the second embodiment, the light combiner 29 is a polarizing beam splitter, and configured for combining the light output from the TIRs 27, 28 to produce a single light output.

The stereo projection optical systems provide viewers three-dimensional images formed by two alternative polarized light beams whose polarizations are perpendicular to each other utilizing the 2-way wheel. The efficiency of light utilization is high; with little power loss is of light compared to the conventional systems.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:
1. A stereo projection optical system, comprising:
a polarization converter configured for converting incident light into polarized light which has single polarization;
a 2-way wheel positioned to receive the polarized light from the polarization converter and comprising a reflective region configured for reflecting the polarized light and a transmissive region configured for transmitting the polarized light, the polarized light incident on one of the reflective region and the transmissive region at any given time;
a retarder positioned to receive a light emerging from one of the reflective region and the transmissive region; and
an image engine positioned to receive light output of the 2-way wheel and the retarder and configured for emitting the light output comprising spatial information, wherein the image engine comprises:
a polarizing beam splitter positioned to receive the light output of the 2-way wheel and the retarder;
a digital micro-mirror device positioned to receive emergent light from the polarizing beam splitter; and
a total internal reflective prism positioned to receive the light output from the polarizing beam splitter and configured for coupling the emergent light of the polarizing beam splitter into the digital micro-mirror device and transmitting the light output from the digital micro-mirror device.

2. The stereo projection optical system as claimed in claim 1, wherein the polarizing beam splitter is a wire grid polarizer.

3. The stereo projection optical system as claimed in claim 1, wherein the polarizing beam splitter is a polarizing beam splitter prism.

4. The stereo projection optical system as claimed in claim 1, further comprising a plurality of analyzers disposed in the light paths between the polarizing beam splitter and the 2-way wheel.

5. The stereo projection optical system as claimed in claim 4, wherein the analyzer is a polarizer.

6. The stereo projection optical system as claimed in claim 1, further comprising a plurality of reflective apparatuses disposed between the image engine and the 2-way wheel and configured for coupling the light output of the 2-way wheel into the image engine.

7. The stereo projection optical system as claimed in claim 1, further comprising a projecting lens positioned to receive the emergent light of the image engine and configured for projecting an image.

* * * * *